J. F. FLAHERTY.
ROLLER BEARING.
APPLICATION FILED SEPT. 19, 1919.
1,389,040.
Patented Aug. 30, 1921.
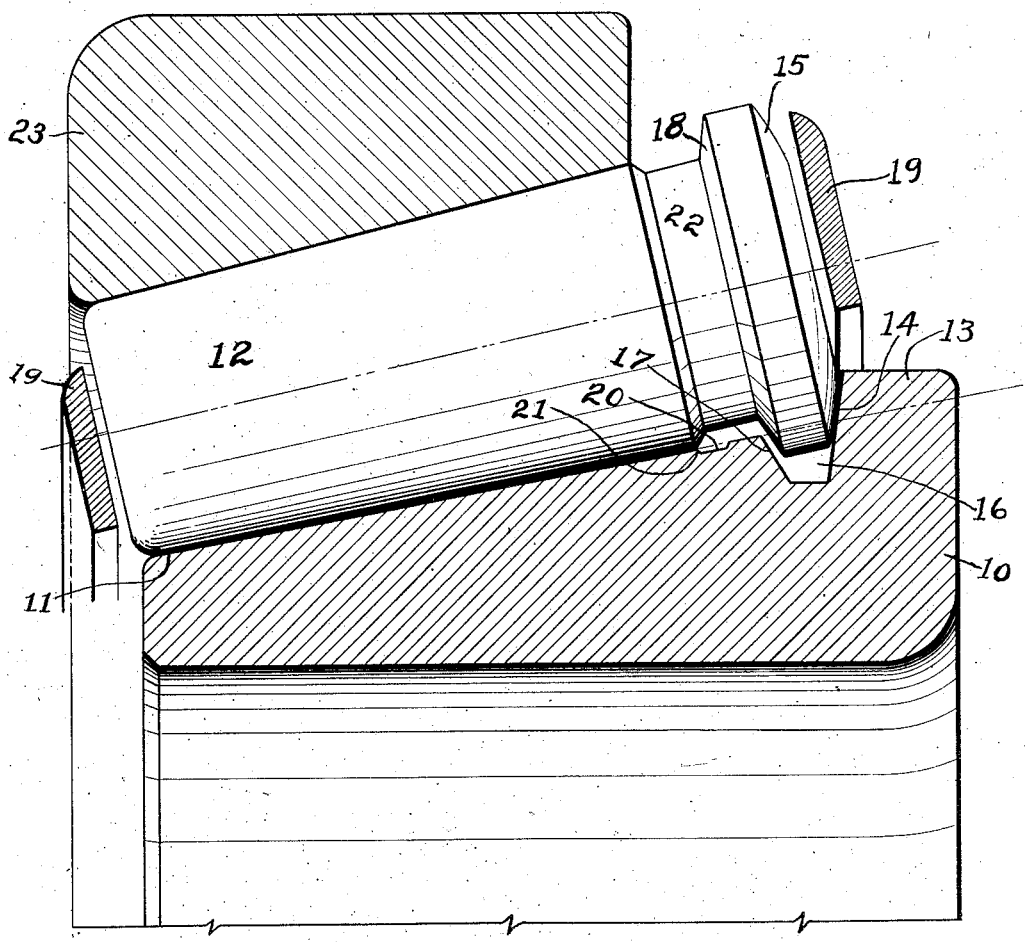
Inventor
JOHN F. FLAHERTY.

UNITED STATES PATENT OFFICE.

JOHN F. FLAHERTY, OF TOLEDO, OHIO, ASSIGNOR TO THE BOCK BEARING COMPANY, OF TOLEDO, OHIO, A CORPORATION OF OHIO.

ROLLER-BEARING.

1,389,040.  Specification of Letters Patent.  Patented Aug. 30, 1921.

Application filed September 19, 1919. Serial No. 324,976.

*To all whom it may concern:*

Be it known that I, JOHN F. FLAHERTY, a citizen of the United States, and a resident of Toledo, county of Lucas, State of Ohio, have invented certain new and useful Improvements in Roller-Bearings, of which the following is a specification.

This invention relates to tapered roller bearings and has for its objects the provision of certain improvements which will lessen the cost of manufacture and increase the life of the bearings.

Other objects of the invention and the features of novelty will be apparent from the following description taken in connection with the accompanying drawing, which is a longitudinal section through one-half of a bearing embodying my invention.

In the drawing, 10 indicates the inner member or cone, which is provided with the conical rolling surface 11 for the rollers 12 and is also provided with a flange or collar 13, at its larger end, having a thrust surface 14 against which the outer side 15 of the roller abuts. Adjacent the thrust surface or abutment 14, there is a groove 16 into which the heads of the rollers project, the side 17 of this groove conforming closely to the inner side 18 of the head of the roller to restrain the latter against endwise movement. The rollers 12 are preferably assembled with the cone 10 and the cage 19. The details of construction of the cage 19 form no part of the present invention and, therefore, a description thereof is omitted.

For convenience and economy of manufacture, the surface 11 of the cone is extended to the groove 16 and in order to have the rolling surface coincide, in extent, with the rolling surface of the roller 12, a groove 20 is provided, the side 21 of which coincides with the larger end of the rolling surface of the roller. It has been found that when the rolling surfaces of the roller and cone do not thus coincide, there is a tendency for the metal to crumble, due to the excessive stresses to which it is subjected, as a result of slight wearing of the parts.

Between the head of the roller and its rolling surface, there is a groove, 22 and the groove 20, as will be seen from the drawing, is opposite this groove, although I prefer to not have the groove 20 extend to the side 17 of the groove 16, as the arrangement provided serves to better hold the rollers assembled with the cone. As is customary in tapered roller bearings, there is a cup or outer member 23 with which the rollers coöperate.

Having thus described my invention, what I claim is:

In a tapered roller bearing, a conical inner member having an abutment and a groove adjacent to said abutment, and a plurality of rollers assembled with said member and having enlarged heads entering said groove and restrained from endwise movement by the sides thereof, the outer sides of said heads normally contacting with said abutment to take the roller end thrust, each of said rollers having a groove between its head and rolling surface, and said member being cut away from the projected cone of its rolling surface so that the distance from said abutment to the larger end of said rolling surface will be the same as the distance from the outer side of the heads of the rollers to their rolling surfaces, as measured on the projected cones of said rolling surfaces.

In testimony whereof I affix my signature.

JOHN F. FLAHERTY.